United States Patent [19]

Taniai et al.

[11] Patent Number: 5,463,740
[45] Date of Patent: Oct. 31, 1995

[54] DATA CONTROL DEVICE GENERATING DIFFERENT TYPES OF BUS REQUESTS AND TRANSMITTING REQUESTS DIRECTLY TO ONE OF A NUMBER OF ARBITERS FOR OBTAINING ACCESS TO A RESPECTIVE BUS

[75] Inventors: Takayoshi Taniai, Kawasaki; Hajime Satoh, Tokyo; Hidetoshi Shimura; Tadashi Saitoh, both of Kawasaki, all of Japan

[73] Assignee: Fujitsu Limited & Fujitsu Microcomputer Systems Ltd., Kanagawa, Japan

[21] Appl. No.: 387,633

[22] Filed: Feb. 13, 1995

Related U.S. Application Data

[63] Continuation of Ser. No. 18,335, Feb. 22, 1993, abandoned, which is a continuation of Ser. No. 400,298, Aug. 29, 1989, abandoned.

[30] Foreign Application Priority Data

Sep. 2, 1988 [JP] Japan ................... 63-218428

[51] Int. Cl.[6] .......................... G06F 13/36; G06F 13/14; G06F 13/00
[52] U.S. Cl. .................. 395/299; 340/825.5; 364/240; 364/242.6; 364/242.92; 364/DIG. 1; 364/935; 364/935.4; 364/935.41; 395/308
[58] Field of Search ....................... 395/725, 800, 395/200, 325, 375; 340/825.5

[56] References Cited

U.S. PATENT DOCUMENTS

| | | | |
|---|---|---|---|
| 3,940,743 | 2/1976 | Fitzgerald | 395/325 |
| 4,041,472 | 8/1977 | Shah et al. | 395/325 |
| 4,130,865 | 12/1978 | Heart et al. | 395/200 |
| 4,205,373 | 5/1980 | Shah et al. | 364/DIG. 1 |
| 4,257,095 | 3/1981 | Nadir | 364/DIG. 1 |
| 4,257,099 | 3/1981 | Appelt | 395/325 |
| 4,300,194 | 11/1981 | Bradley et al. | 395/325 |
| 4,402,040 | 8/1983 | Evett | 395/325 |
| 4,414,624 | 11/1983 | Summer, Jr. et al. | 395/650 |
| 4,459,665 | 7/1984 | Miu et al. | 395/325 |
| 4,590,556 | 5/1986 | Berger et al. | 364/DIG. 1 |
| 4,649,471 | 3/1987 | Briggs et al. | 364/DIG. 1 |
| 4,695,944 | 9/1987 | Zandveld et al. | 395/325 |
| 4,700,292 | 10/1987 | Campanini | 395/200 |
| 4,729,093 | 3/1988 | Mothersole et al. | 395/375 |
| 4,802,087 | 1/1989 | Keeley et al. | 395/725 |
| 4,818,985 | 4/1989 | Ikeda | 340/825.5 |
| 4,837,682 | 6/1989 | Culler | 364/DIG. 1 |
| 4,868,741 | 9/1989 | Gula et al. | 395/325 |
| 4,897,784 | 1/1990 | Nay | 364/DIG. 1 |

*Primary Examiner*—Thomas G. Black
*Assistant Examiner*—Paul Harrity
*Attorney, Agent, or Firm*—Nikaido, Marmelstein, Murray & Oram

[57] ABSTRACT

A data control device which acquires the right to use a bus and performs data control includes a request circuit which selectively generates a plurality of request signals for acquiring the right to use corresponding buses. The plurality of request signals are based on attributes of data to be exchanged with an external device. The exchanged data includes data and commands.

20 Claims, 9 Drawing Sheets

FIG.4A
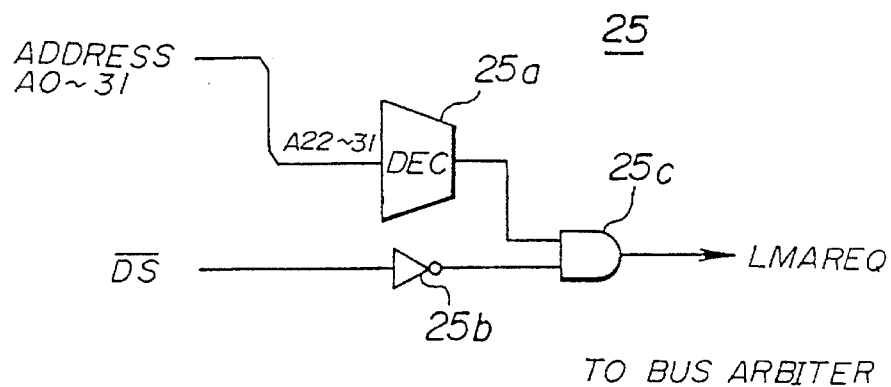
FIG.4B(a) ADDRESS 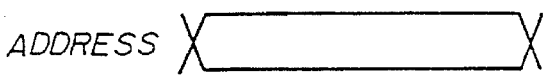
FIG.4B(b) DATA 
FIG.4B(c) R/W̄ 
FIG.4B(d) ĀS 
FIG.4B(e) D̄S 
FIG.4B(f) D̄C 
FIG.5
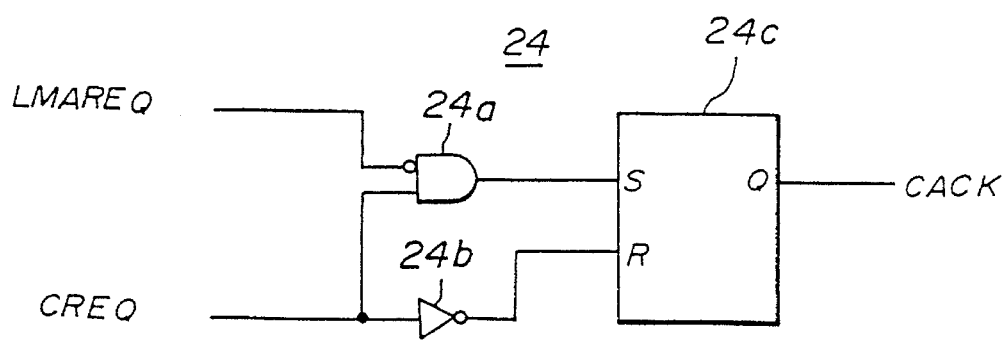

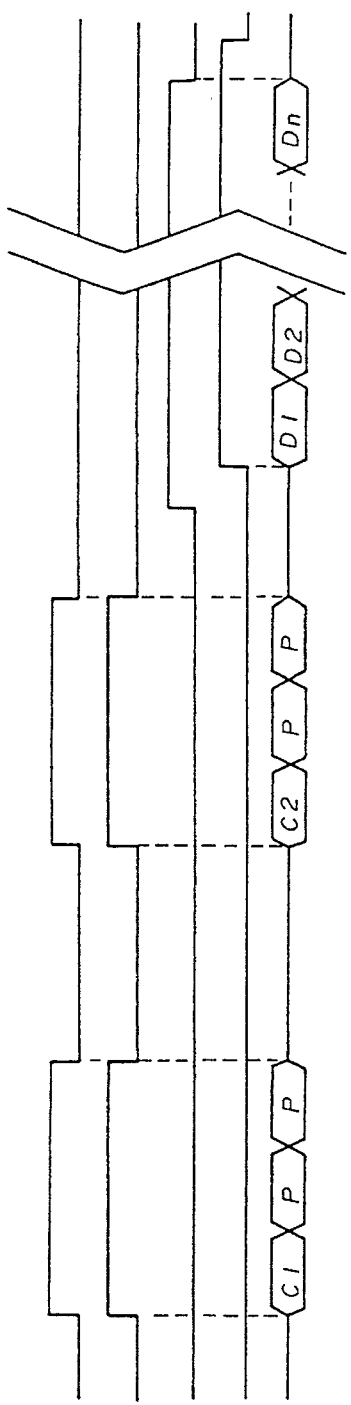
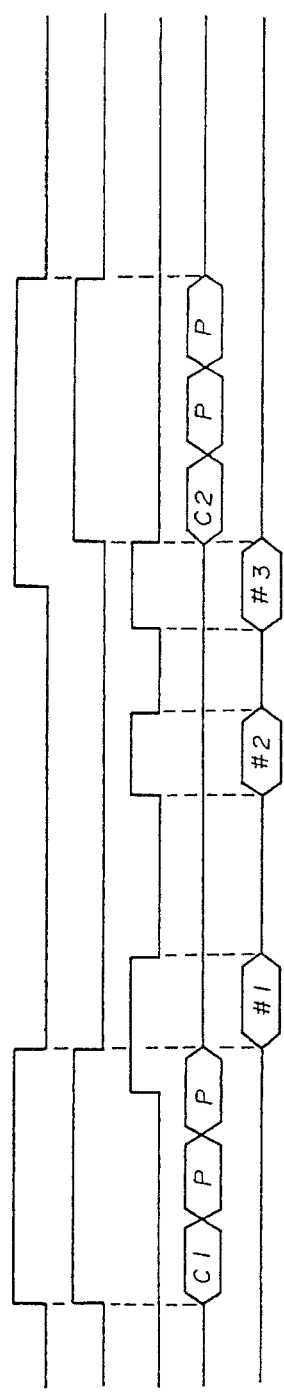

DATA CONTROL DEVICE GENERATING DIFFERENT TYPES OF BUS REQUESTS AND TRANSMITTING REQUESTS DIRECTLY TO ONE OF A NUMBER OF ARBITERS FOR OBTAINING ACCESS TO A RESPECTIVE BUS

This application is a continuation of application Ser. No. 08/018,335, filed on Feb. 22, 1993, now abandoned, which is a continuation of application Ser. No. 07/400,298 filed on Aug. 29, 1989, now abandoned.

FIELD OF THE INVENTION

The present invention generally relates to a data control device, and particularly to a data control device such as an image display device or a direct memory access controller. The present invention more particularly relates to a bus arbitration for controlling requests for acquiring the right to use buses of a system, which includes a central processing unit and a data control device. The present invention further relates to a system which employs the above-mentioned bus arbitration.

BACKGROUND OF THE INVENTION

Conventionally, there is a system which includes a central processing unit (hereinafter referred to as a CPU), a peripheral device such as an image display device and a system memory, all of which are coupled to a bus. In such a system, a bus arbiter is provided for controlling the right to use the bus.

Referring to FIG. 1, there is illustrated a conventional system which includes a peripheral device 1 and a CPU 2, each of which serves as a bus master. The CPU 2 is connected to a bus 5, and the peripheral device 1 is connected to the bus 5 through a buffer 4. A system memory 3 of large size is connected to the bus 5. The system memory 3 functions as a working memory for the CPU 2 and stores data and commands which are supplied to the peripheral device 1. A bus arbiter 6 receives a request for acquiring the right to use the bus 5, which is generated by the peripheral device 1, and controls competition of requests for acquiring the right to use the bus 5 which are generated by the peripheral device 1 and the CPU 2. When the peripheral device 1 needs a command or data stored in the system memory 3, it sends a request signal REQ to the bus arbiter 6. In response to the request signal REQ, the bus arbiter 6 sends the CPU 2 a hold request signal HREQ. When the CPU 2 can transfer the right to use the bus 5 to the peripheral device 1, the CPU 2 returns a hold acknowledge signal HACK to the bus arbiter 6. In response to the hold acknowledge signal HACK, the bus arbiter 6 sends an acknowledge signal ACK to the peripheral device 1. At the same time, the bus arbiter 6 outputs a gate signal to the buffer 4 so as to turn ON the buffer 4 whereby the peripheral device 1 can be connected to the bus 5. Then the peripheral device 1 obtains a command or data stored in the system memory 3 through the bus 5 and the buffer 4. When the peripheral device 1 inputs a command or data from the CPU 2, the system operates in the same manner.

However, the conventional system has disadvantages described below. When the peripheral device 1 such as an image display device needs data such as image data stored in the system memory 3, the peripheral device 1 acquires the right to use the bus 5, and reads out image data from the system memory 3. Normally, a large amount of image data (in a unit of kilo-words to mega-words) is successively read out and then input in the peripheral device 1 at one time. Therefore, efficiency in using the CPU 2 and the bus 5 is high.

On the other hand, when the peripheral device 1 needs a command, which is to be supplied from the system memory 3 or the CPU 2, the peripheral device 1 acquires the right to use the bus 5 and inputs a small amount of data related to the command (equal to a few words, for example). When the command has been input in the peripheral device 1, the peripheral device 1 releases the bus 5 from the exclusive use. When a next command is needed, the peripheral device 1 acquires the right to use the bus 5 again and inputs a small amount of data. Thereafter, the peripheral device 1 releases the bus 5 again. Each time the peripheral device 1 acquires the right to use the bus 5, the CPU 2 must interrupt operation. Thus, efficiency in using the CPU 2 and the bus 5 is low.

SUMMARY OF THE INVENTION

Accordingly, a general object of the present invention is to provide an improved peripheral device (data control device) and an improved system which uses the improved peripheral device in which the above-mentioned disadvantages are eliminated.

A more specific object of the present invention is to provide a data control device capable of selectively using buffers based on attributes of data ("data" is a concept including commands) such as an amount of data to be transferred or a frequency in access so that a system can operate effectively and efficiently.

The above objects of the present invention can be achieved by a data control device which acquires the right to use a bus and performs data control, comprising microprogram storing device for storing microprograms, command register device for registering a command supplied from an external device, address generating device, coupled to the command register device and the microprogram storing device, for generating an address signal to be supplied to the microprogram storing device by using the command registered in the command register device, and the microprogram storing device generating control signals corresponding to one of the microprograms related to the address signal supplied from the address generating device. The device further comprises data processing device for processing data to be supplied from or to an external device, and request generating device, coupled to the microprogram storing device, for selectively generating a plurality of request signals for acquiring the right to use corresponding buses by using the control signals supplied from the microprogram storing device. The plurality of request signals are based on attributes of data to be exchanged with the external device. The exchanged data includes the data to be processed by the data processing device and the command to be registered in the command register device.

Another object of the present invention is to provide a system which uses the above-mentioned data control device.

That object of the present invention can be achieved by a data control system comprising a first bus and a second bus, data processing unit, coupled to the first bus, for processing data to be transferred through the first bus and for generating a local request signal, and peripheral device, coupled to the second bus, for processing data to be transferred through the second bus and for selectively generating first and second request signals for acquiring the right to use the first and second buses on the basis of attributes of the data to be transferred. The system further comprises first bus arbiter, provided for the first bus, for determining whether the right to use the first bus should be given to the peripheral device on the basis of the first request signal supplied from the peripheral device, second bus arbiter, provided for the second bus, for determining whether the right to use the second bus should be given to the peripheral device or the data processing unit on the basis of the second request signal supplied from the peripheral device and the local request signal supplied from the processing unit, first and second memory, coupled to the first and second buses, for storing data to be output to the first and second buses, respectively, and buffer device, provided between the first and second buses, for preventing data on the first bus from competing with data on the second bus.

The aforementioned objects of the present invention can also be achieved by a data control system comprising a plurality of first buses, a second bus, data processing unit, provided for each of the first buses and connected thereto, for processing data to be transferred through related one of the first buses and for generating a local request signal, and peripheral device, coupled to the second bus, for processing data to be transferred through the second bus and for selectively generating a plurality of request signals for acquiring to the right to use the plurality of buses on the basis of attributes of the data to be transferred. The system further comprises first bus arbiter, provided for each of the first buses, for determining whether the right to use the first bus should be given to the peripheral device on the basis of related one of the request signals supplied from the peripheral device, and second bus arbiter, provided for the second bus, for determining whether the right to use the second bus should be given to the peripheral device or the data processing unit on the basis of the second request signal supplied from the peripheral device and the local request signals supplied from the processing unit. Furthermore, the system comprises first memory, coupled to each of the first buses, for storing data to be output to related one of the first buses, second memory, coupled to the second bus, for storing data to be output to the second bus, and buffer, provided between the second bus and each of the first buses, for preventing data on the first bus from competing with data on related one of the second buses.

Additional objects, features and advantages of the present invention will become apparent from the following detailed description when read in conjunction with the accompanying drawings.

BRIEF DESCRIPTION OF THE DRAWINGS

FIG. 4A is a circuit diagram of a local memory access request generator shown in FIG. 3;

FIGS. 4B (a)–4B are timing charts of signals on a system bus or a local bus shown in FIG. 3;

FIG. 5 is a circuit diagram of a bus arbiter shown in FIG. 3;

FIGS. 7a–7e is a timing chart of signals obtained when a command and image data are input in an image display device shown in FIG. 3;

FIGS. 8a–8e are charts timing of signals obtained when a request for access to a local memory shown in FIG. 3 by the image display device competes with a request for access to the local memory by a central process unit through the local memory access request generator;

DESCRIPTION OF THE PREFERRED EMBODIMENTS

A description is given of a first preferred embodiment of the present invention.

Figure 1:
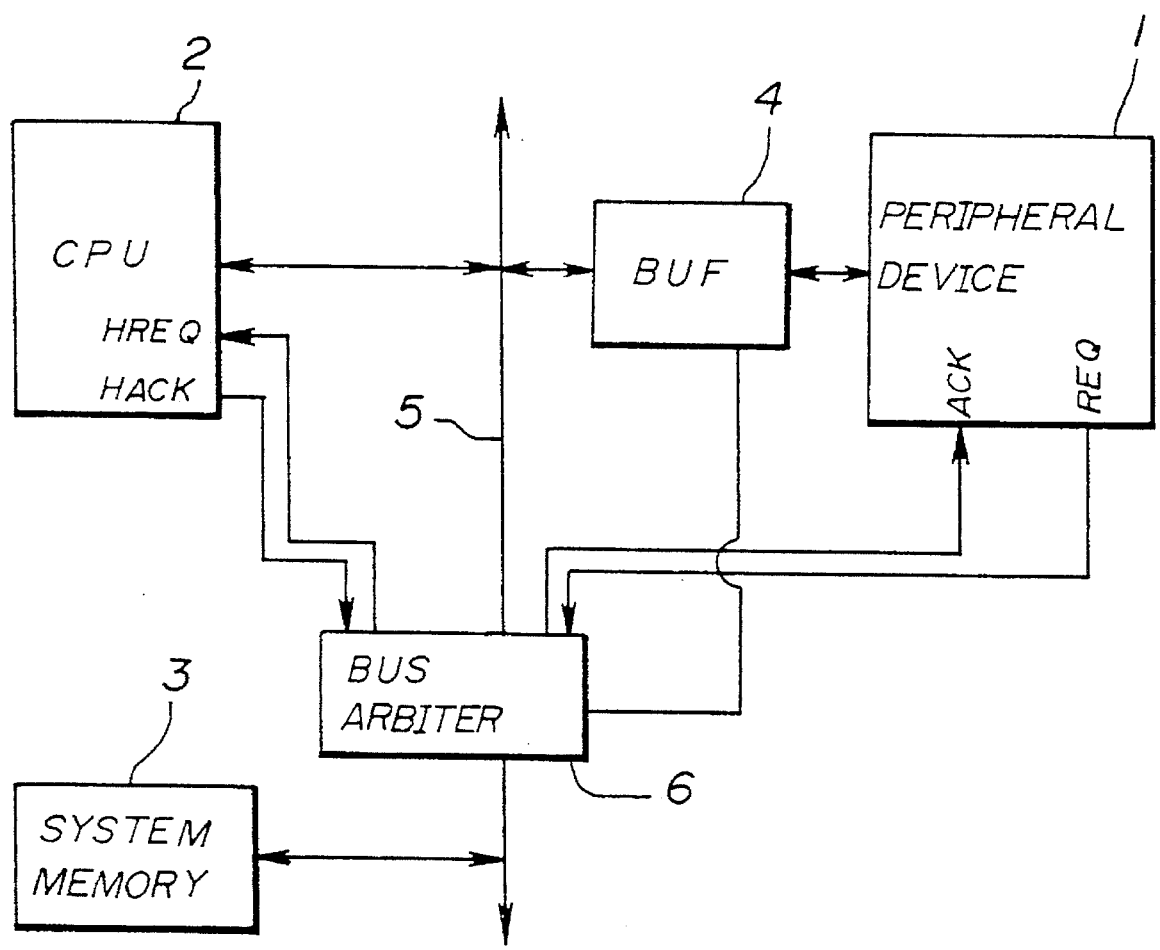
FIG. 1 is a block diagram of a conventional system which includes a CPU and a peripheral device.
Figure 2:
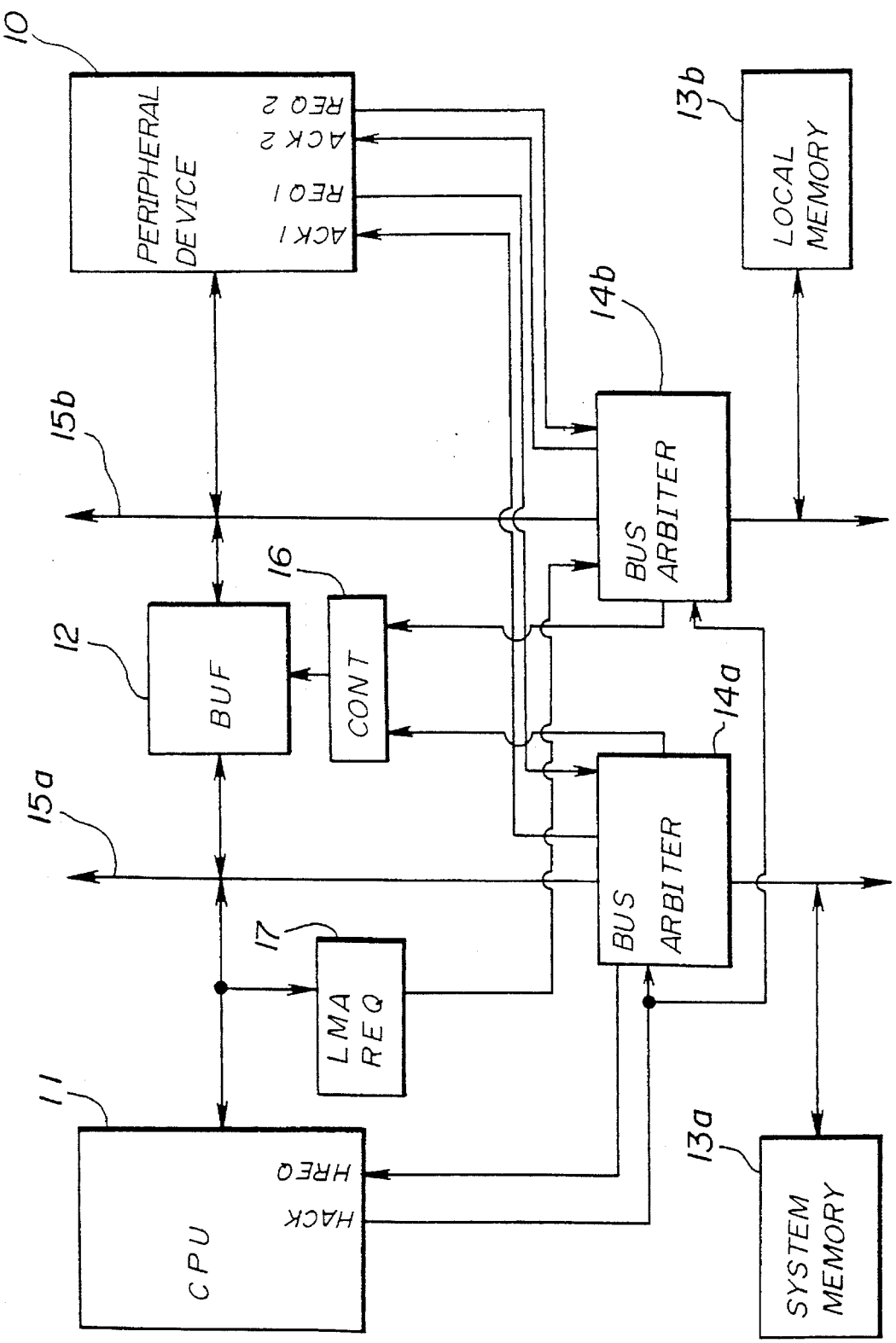
FIG. 2 is a block diagram illustrating a fundamental structure of a system according to a first preferred embodiment of the present invention where a single CPU is employed.

Referring to FIG. 2, there is illustrated a system which includes a CPU 11 and a peripheral device 10 such as an image display device or a direct memory access controller. The peripheral device 10 handles a first pair of a request signal REQ1 and an acknowledge signal ACK1, and a second pair of a request signal REQ2 and an acknowledge signal ACK2. This structure of the peripheral device 10 is clearly distinguishable from the conventional peripheral device 1 shown in FIG. 1. As will be described in detail later, the peripheral device 10 selectively uses either the first pair or the second pair on the bases of attributes of data which are handled by the peripheral device 10. The CPU 11 is connected to a bus 15a, and the peripheral device 10 is connected to a bus 15b. A buffer 12 is interposed between the buses 15a and 15b, and is controlled by a buffer controller 16. The buffer 12 is formed by a bidirectional buffer.

A system memory 13a is connected to the bus 15a, and is formed by a memory having a large storage capacity. The system memory 13a functions as a working memory for the CPU 11, and is capable of storing a large amount of data such as image data. A local memory 13b is connected to the bus 15b, and may be formed by a memory having a small storage capacity. The local memory 13b stores commands which are executed by the peripheral device 10.

A bus arbiter 14a controls requests for acquiring the right to use the bus 15a. Similarly, a bus arbiter 14b controls requests for the right to use the bus 15b. The first pair of the request signal REQ1 and the acknowledge signal ACK1 is transferred between the bus arbiter 14a and the peripheral device 10, and the second pair of the request signal REQ2 and the acknowledge signal ACK2 is transferred between the bus arbiter 14b and the peripheral device 10. In response to the request signal REQ1, the bus arbiter 14a sends the CPU 11 the aforementioned hold request signal HREQ for requesting the right to use the bus 15a to be transferred to the peripheral device 10. When this request can be accepted, the CPU 11 returns the hold acknowledge signal HACK to the bus arbiter 14a. A local memory access request signal generator 17 (hereinafter simply referred to as an LMAREQ generator) supplies the bus arbiter 14b with a local memory access request signal LMAREQ when the CPU 11 generates a request for accessing the local memory 13b.

The bus arbiter 14a generates a control signal to be supplied to a buffer controller 16 by using the request signal REQ1 and the hold acknowledge signal HACK. The bus arbiter 14b generates a control signal to be supplied to the buffer controller 16 by using the request signal REQ2 as well as the local memory access request signal LMAREQ. The bus controller 16 generates a buffer control signal from the control signals supplied from the bus arbiters 14a and 14b. The generated buffer control signal controls indicate whether the buffer 12 should be turned ON/OFF and indicates a direction in which data is transferred between the buses 15a and 15b.

When the peripheral device 10 wants to access the system memory 13a, it makes the request signal REQ1 active by switching it to a high (H) level. In response to the request signal REQ1, the bus arbiter 14a makes the hold request signal HREQ active. When the CPU 11 can transfer the right to use the bus 15a to the peripheral device 10, it makes the hold acknowledge signal HACK active. In response to the hold acknowledge signal HACK, the bus arbiter 14a makes the acknowledge signal ACK1 active. The control signal derived from the bus arbiter 14a at this time is supplied to the buffer controller 16. The hold acknowledge signal HACK is supplied to the bus arbiter 14b, which then gives the peripheral device 10 the right to use the bus 15b. The control signal derived from the bus arbiter 14b at this time is supplied to the bus controller 16, which generates the buffer control signal which enables data to pass through the buffer 12. Then, the peripheral device 10 supplies the system memory 13a with a related address. Data related to the supplied address is read out from the system memory 13a, and transferred to the peripheral device 10 through the bus 15a, the buffer 12 and the bus 15b. Alternatively, data is supplied from the peripheral device 10 and written into the system memory 13a.

When the peripheral device 10 wants to access the local memory 13b and read a command therefrom, it makes the request signal REQ2 active. When the bus arbiter 14b can give the peripheral device 10 the right to use the bus 15b, it makes the acknowledge signal ACK2 active. In this case, the buffer controller 16 makes the buffer 12 closed by referring to the control signal from the bus arbiter 14b. Then, a command corresponding to an address supplied from the peripheral device 10 is read out from the local memory 13b and then transferred to the peripheral device 10.

When the CPU 11 wants to access the local memory 13b and write a command therein, it controls the LMAREQ generator 17 so as to make the local memory access request signal LMAREQ active. The local memory access request signal LMAREQ derived from the LMAREQ generator 17 is supplied to the bus arbiter 14b. At this time, if the bus arbiter 14b has given the peripheral device 10 the right to use the bus 15b, the acknowledge signal ACK2 is held active. Thus, the buffer 12 is OFF. During this time, data from the bus 15a is prevented from passing through the buffer 12. When the peripheral device 10 releases the bus 15b, it makes the request signal REQ2 inactive. In response to this change, the bus arbiter 14b makes acknowledge signal ACK2 inactive. Then, the buffer controller 16 turns the buffer 12 ON. Thereby, an address signal supplied from the CPU 11 is allowed to pass through the buffer 12 and supplied to the local memory 13b. Then a command derived from the CPU 11 is written into a related area in the local memory 13b.

When the CPU 11 wants to access the system memory 13a, it can use the bus 15a unless the CPU 11 keeps the hold acknowledge signal HACK active.

In the above-mentioned manner, the peripheral device 10 having two request signals REQ1 and REQ2 selects one of either the request signal REQ1 or REQ2 on the basis of attributes (types) of data (which is a concept including commands) to be handled. It is noted that when the peripheral device 10 needs a command, the peripheral device 10 accesses the local memory 13b, or in other words, it is unnecessary to access the system memory 13a. Thus, at this time, the operation of the CUP 11 is not interrupted.

Figure 3:
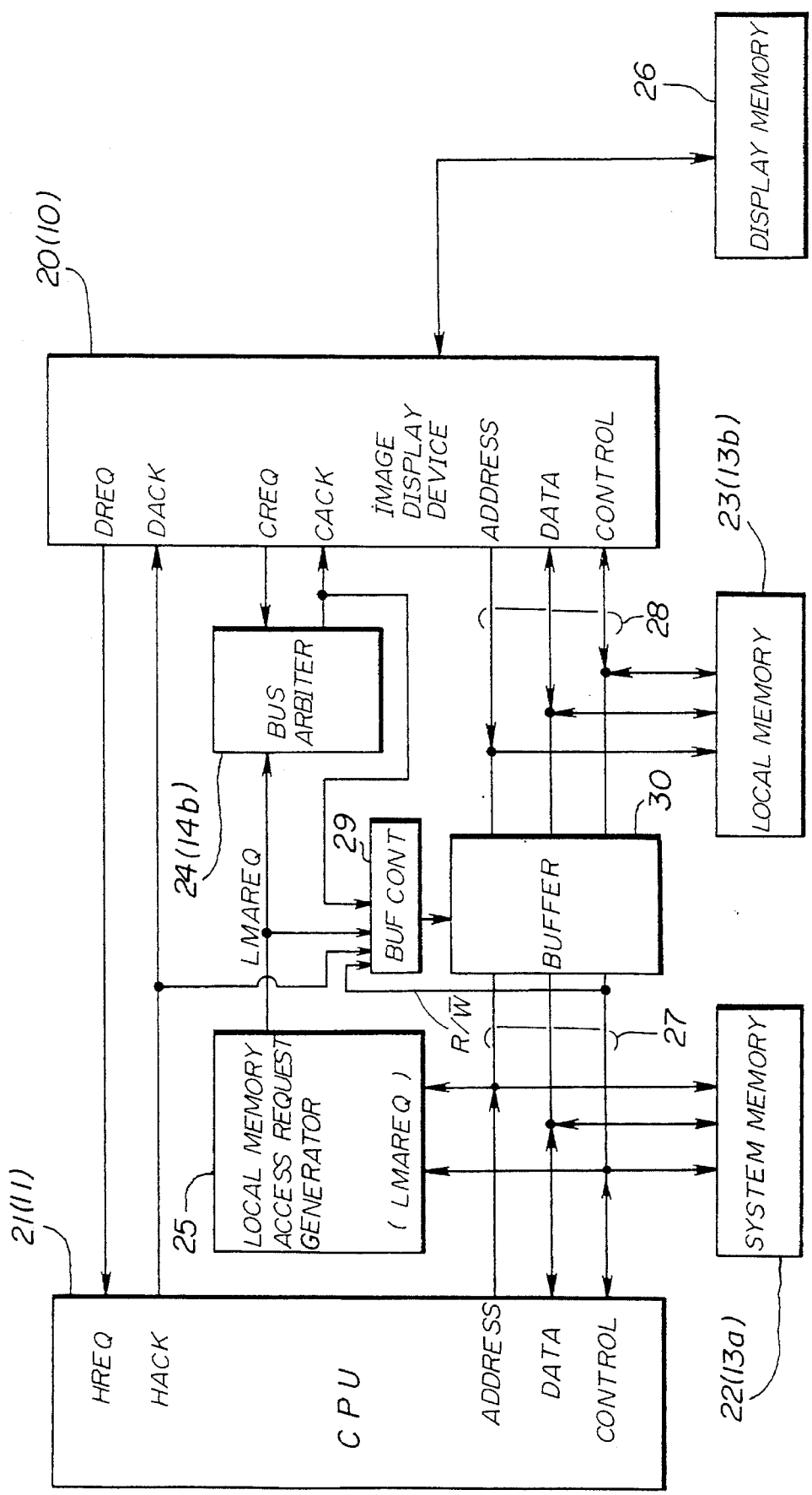
FIG. 3 is a block diagram of a detailed structure for the system shown in FIG. 2.

A description is given of a detailed structure of the system shown in FIG. 2 with reference to FIG. 3. A system shown in FIG. 3 includes an image display device 20 and a CPU 21, which correspond to the peripheral device 10 and the CPU 11 shown in FIG. 2, respectively. The image display device 20 is connected to a buffer 30 through a local bus .28, which consists of an address bus, a data bus and a control bus. The buffer 30 is controlled by a buffer controller 29. A local memory 23, which corresponds to the local memory 13b shown in FIG. 2, is connected to the local bus 28. The CPU 21 is connected to the buffer 30 through a system bus 27, which consists of an address bus, a data bus and a control bus. A system memory 22, which corresponds to the system memory 13a shown in FIG. 2, is connected to the system bus 27.

The image display device 20 can output a data request signal DREQ and a command request signal CREQ, which correspond to the request signals REQ1 and REQ2 shown in FIG. 2, respectively. The data request signal DREQ is input directly, as a hold request signal HREQ, to the CPU 21. A hold acknowledge signal HACK derived from the CPU 21 is supplied directly, as a data request acknowledge signal DACK, to the image display device 20. That is, the bus arbiter 14a shown in FIG. 2 is provided in the CPU 21. The command request signal CREQ derived from the image display device 20 is supplied to a bus arbiter 24, which corresponds to the bus arbiter 14b shown in FIG. 2. When the bus arbiter 24 accepts the command request signal CREQ, it returns a command request acknowledge signal CACK to the image display device 20. A local memory access request (LMAREQ) generator 25, which corresponds to the LMAREQ generator 17 shown in FIG. 2, generates the local memory access request signal LMAREQ, which is supplied to the bus arbiter 24.

FIG. 4A is a circuit diagram of the LMAREQ generator 25. Referring to FIG. 4A, the LMAREQ generator 25 is made up of an address decoder 25a, an inverter 25b and an AND gate 25c. The address decoder 25a is supplied with bits A22–A31 among 32 address bits A0–A31 supplied from the CPU 21 through the system bus 27. When the CPU 21 wants to access the local memory 23, the address decoder 25a decodes the bits A22–A31 and outputs a signal. The inverter 25b inverts a data strobe signal $\overline{DS}$ shown in FIG. 4B, which is a low-active signal. As shown in FIG. 4B, when the CPU 21 accesses the system memory 22 or the local memory 23, it outputs an address signal (FIG. 4B(a)) to the system bus 27. Simultaneously, the CPU 21 outputs a read/write signal $R/\overline{W}$ (FIG. 4B(c)) to the system bus 27. Then the CPU 21 outputs an address strobe signal $\overline{AS}$, and then data strobe signal $\overline{DS}$. When write of data on the system bus 27 (FIG. 4B(b)) into the system memory 22 or the local memory 23 has been completed, a data complete signal $\overline{DC}$ which is derived from the system memory 22 or the local memory 23, is made active. In response to this change in the data complete signal $\overline{DC}$, the data strobe signal $\overline{DS}$, the address strobe signal AS and the read/write signal $R/\overline{W}$ are sequentially made inactive. The image display device 20 handles the signals shown in FIGS.4B(a) through 4B(e) in the same manner as the CPU 21.

Turning to FIG. 4A, the output signals of the address decoder 25a and the inverter 25b are supplied to the AND gate 25c, which generates the local memory access request signal LMAREQ to be supplied to the bus arbiter 24.

FIG. 5 is a circuit diagram of the bus arbiter 24. Referring to FIG. 5, the bus arbiter 24 is made up of an AND gate 24a having an inverter, an inverter 24b and an RS (reset/set) flip-flop 24c. The local memory access request signal LMAREQ from the LMAREQ generator 25 is supplied to the AND gate 24a through the inverter. The other input terminal of the AND gate 24 is directly supplied with the command request signal CREQ derived from the image display device 20. The output signal of the AND gate 24a is supplied to a set terminal of the flip-flop 24c. A reset terminal of the flip-flop 24c is supplied with the command request signal CREQ through the inverter 24b. A Q-terminal output signal of the flip-flop 24c forms the command request acknowledge signal CACK, which is to be supplied to the image display device 20. When the local memory access request signal LMAREQ is 'L' (inactive) and the command request signal CREQ is 'H' (active), the command request acknowledge signal CACK is switched to 'H'. On the other hand, when the command request signal CREQ is switched from 'H' to 'L', the command request acknowledge signal CACK is changed to 'L'.

Figure 6:
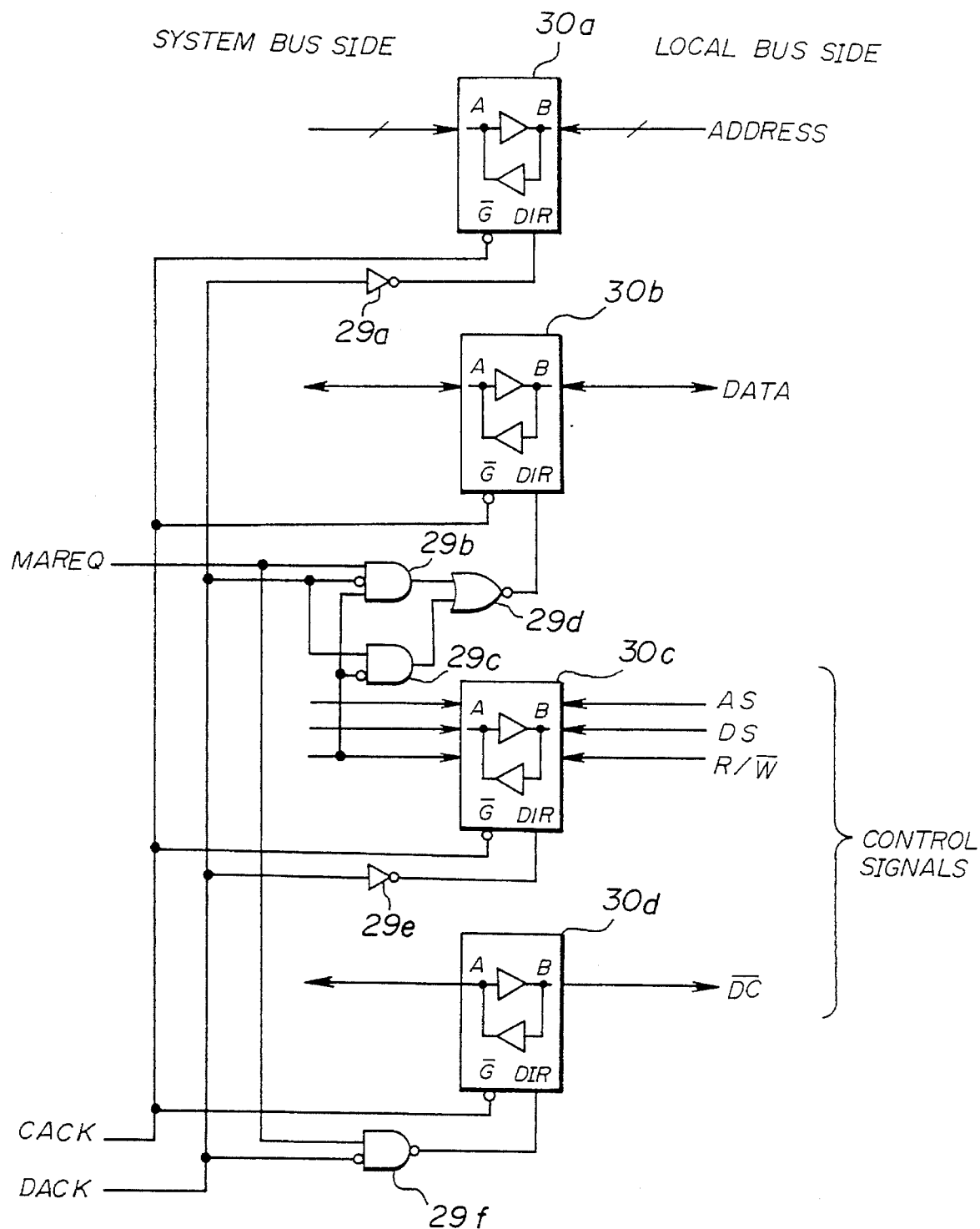
FIG. 6 is a circuit diagram of a buffer and a buffer controller shown in FIG. 3.

FIG. 6 is a circuit diagram of the buffer 30 and the buffer controller 29 shown in FIG. 3. The buffer controller 29 is made up of inverters 29a and 29e, AND gates 29b, 29c and 29f having inverters, and an NOR gate 29d. The buffer controller 29 is supplied with the data request acknowledge signal DACK, the local memory access request signal LMAREQ, the command request acknowledge signal CACK, and the read/write signal R/$\overline{\text{W}}$ which is supplied from the system bus 27. The buffer 30 is made up of bidirectional buffers 30a, 30b, 30c and 30d, each of which has a low-active gate terminal $\overline{\text{G}}$ (having an inverter) and a direction terminal DIR. The gate terminal $\overline{\text{G}}$ of each of the bidirectional buffers 30a to 30d is supplied with the command request acknowledge signal CACK. When the command request acknowledge signal CACK is 'L', each of the bidirectional buffer 30a to 30d is OFF where signals are prevented from passing therethrough. On the other hand, when the command request acknowledge signal CACK is 'H', each of the bidirectional buffers 30a to 30d passes data in the direction which is specified by a signal applied to the direction terminal DIR thereof. When the direction terminal DIR is 'H', each of the bidirectional buffers 30a to 30d passes data only in the direction of A to B. On the other hand, when the direction terminal DIR is 'L', each of the bidirectional buffers 30a to 30d only passes data only in the direction of B to A. The above-mentioned operation of each bidirectional buffer is shown in the following table.

TABLE

|  | $\overline{\text{G}}$ | DIR |
| --- | --- | --- |
| A → B | L | H |
| B → A | L | L |
| OFF | H | X (don't care) |

The direction terminal DIR of the bidirectional buffer 30a is supplied with the data request acknowledge signal DACK through the inverter 29a. The signal to be supplied to the direction terminal DIR of the bidirectional buffer 30b is formed by a logic circuit consisting of the AND gates 29b, 29c having inverters and the NOR gate 29d. This logic circuit is supplied with the data request acknowledge signal DACK, the local memory access request signal LMAREQ, and the read/write signal R/$\overline{\text{W}}$. The output of the OR gate 29d is connected to the direction terminal DIR of the bidirectional buffer 30b. The direction terminal DIR of the bidirectional buffer 30c is supplied with the data request acknowledge signal DACK through the inverter 29e. The direction terminal DIR of the bidirectional buffer 30d is supplied with an output signal of the gate 29f having two inverters. The data request acknowledge signal DACK is supplied to the AND gate 29f through the inverter and the local memory access request signal LMAREQ is directly supplied to the AND gate 29f. The output signal of the AND gate 29f is supplied to the direction terminal DIR of the bidirectional buffer 30d through the inverter.

A description is given of an operation of the embodiment shown in FIG. 3. First, by referring to FIG. 7, a case is described where a command is input in the image display device 20 from the local memory 23 and then image data is transferred from the system memory 22 to the image display device 20. As shown in FIG. 7, the image display device 20 makes the command request signal CREQ active by setting it to 'H' level. If the local memory access request signal LMAREQ is in the inactive state at this time, the bus arbiter 24 makes the command request acknowledge signal CACK active by switching it to 'H' level. During the time when the command request signal CREQ is 'H', the image display device 20 holds the data request signal DREQ 'L'. Since the command request acknowledge signal CACK is 'H', all of the bidirectional buffers 30a to 30d shown in FIG. 6 are closed. An address signal derived from the image display device 20 is supplied to the local memory 23, and a corresponding command C1 and two subsequent parameters P (FIG. 7(e)) are read out from the local memory 23 and transferred to the image display device 20 in accordance with a cycle thereof as shown in FIG. 7(e). After executing the command C1, the image display device 20 inputs a subsequent command C2 and two parameters P in the same manner. If the command C2 is an image data transfer command, the image display device 20 makes the data request signal DREQ active by switching it to 'H' level.

When the CPU 21 can transfer the image display device 20 the right to use the system bus 27, the CPU 21 makes the hold acknowledge signal HACK active, that is, the data request acknowledge signal DACK active. At this time, the command request acknowledge signal CACK has been made inactive. Thus, the bidirectional buffer 30a passes an address signal derived from the image display device 20. Then the address signal is supplied to the system memory 22 through the system bus 27. When the image display device 20 requires to input image data, it sets the read/write signal R/$\overline{\text{W}}$ to 'H' level. Since the signals LMAREQ and CACK are 'L' and the signals DACK and R/$\overline{\text{W}}$ are 'H', the bidirectional buffer 30b can pass image data only in the direction of A to B. Thus, as shown in FIG. 7(e), data D1, D2, . . . are successively read out from the system memory 22 and are transferred to the image display device 20. During this operation, the bidirectional buffer 30c passes control signals such as the address strobe signal $\overline{\text{AS}}$ and data strobe signal $\overline{\text{DS}}$ only in the B-to-A direction. When the last data DN is transferred, the image display device 20 makes the data request signal DREQ inactive. The transferred data are stored in a display memory 26 coupled to the image display device 20.

A description is given of a case where the data request signal DREQ derived from the image display device 20 competes with the local memory access request signal LMAREQ derived from the LMAREQ generator 25, by referring to FIG. 8. It is now assumed that as shown in FIG. 8, the local memory access request signal LMAREQ is made active when the command C1 and the parameters P are being read out from the system memory 22. At this time, since the command request acknowledge signal CACK is held 'H', all the bidirectional buffers 30a to 30d are closed. That is, the command request acknowledge signal CACK keeps the CPU 21 waiting for completion of transferring the last parameter P. When inputting the last parameter P has been completed, the image display device 20 makes the command request signal CREQ inactive. Then, the first access #1 to the local memory 23 by the CPU 21 is executed. If the CPU 21 writes a command into the local memory 23, the read/write signal R/$\overline{\text{W}}$ is set to 'L' level and thus the bidirectional buffer 30b passes this command in the A-to-B direction. On the other hand, if the CPU 21 reads a command from the local memory 23, the read/write signal R/$\overline{\text{W}}$ is set to 'H' and thus the bidirectional buffer 30b passes this command in the B-to-A direction. Then the second and third accesses #2 and #3 to the local memory 23 are subsequently executed in the same manner.

In the case of FIG. 8, when the third access #3 is being executed, the image display device 20 makes the command request signal CREQ active. When the third access #3 has been completed, the data complete signal $\overline{\text{DC}}$ is supplied from the local memory 23 to the CPU 21 through the bidirectional buffer 30d. In response to the reception of the data complete signal $\overline{\text{DC}}$, the CPU 21 controls the LMAREQ generator 25 so as to make the LMAREQ signal inactive. Thereby, the command request acknowledge signal CACK is made active by the bus arbiter 24. Then the image display device 20 inputs the command C2 and the parameters P in the aforementioned manner.

Figure 9:
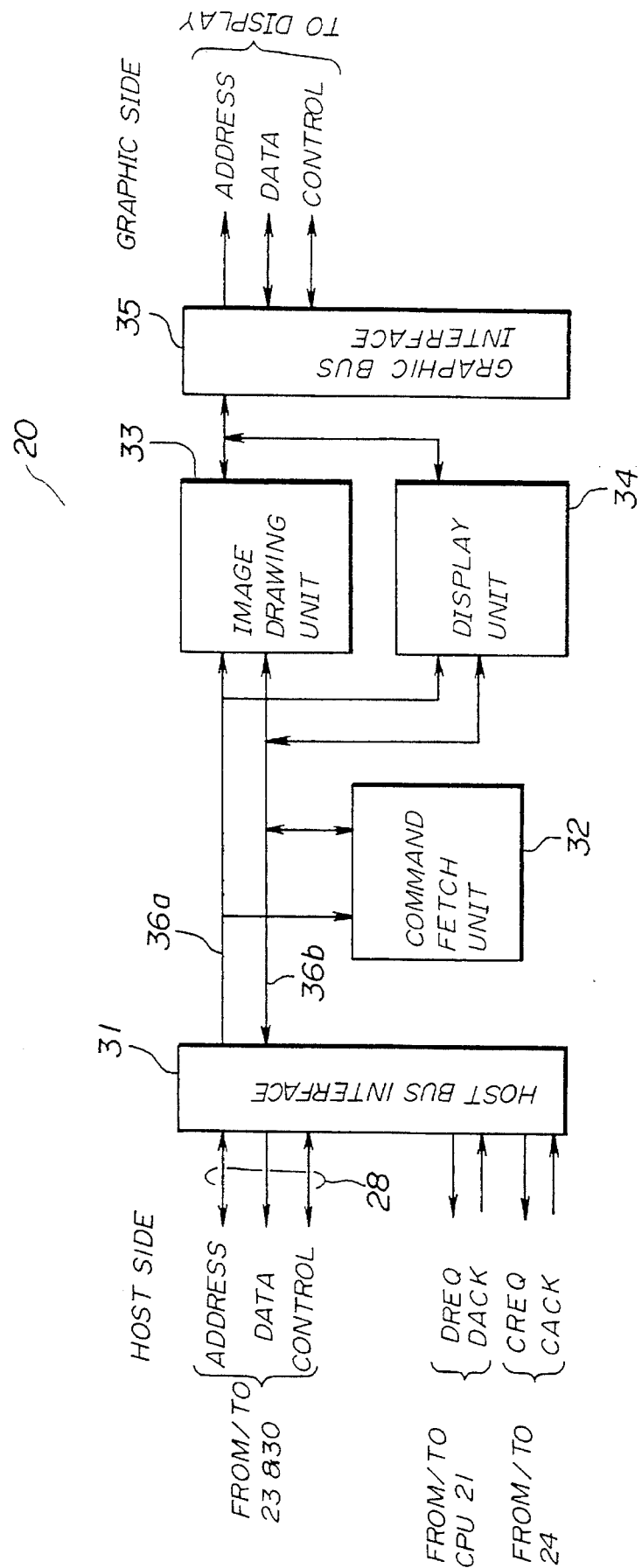
FIG. 9 is a block diagram of a structure of the image display device.
Figure 10:
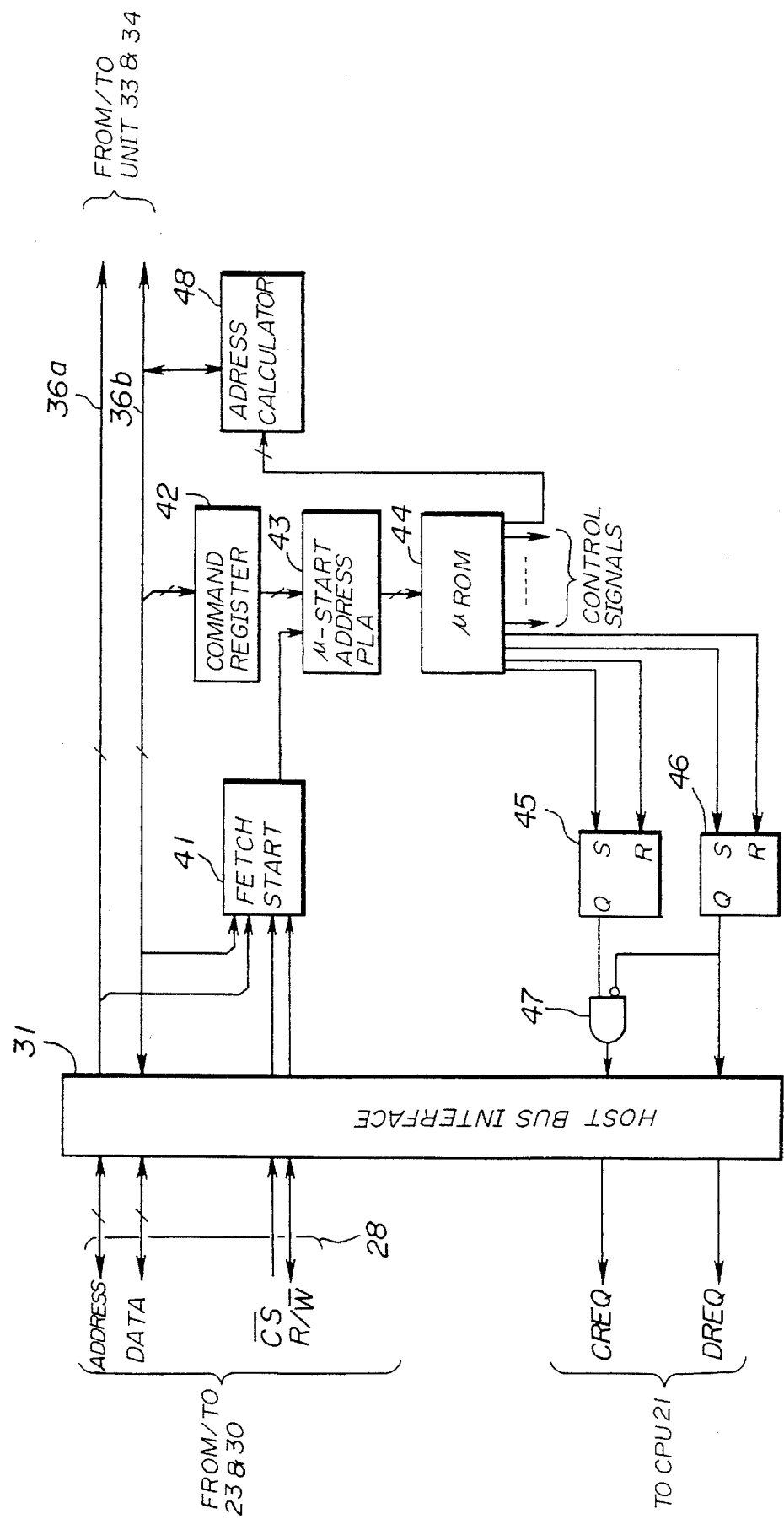
FIG. 10 is a block diagram of a command fetch unit provided in the image display device.

A description is given of an example of the structure of the image display device 20 with reference to FIGS.9 and 10. A host bus interface circuit 31 interfaces with the CPU 21, the buffer 30, the local memory 23, and the bus arbiter 24. An internal address bus 36a and an internal data bus 36b extend from the host bus interface circuit 31. A command fetch unit 32, an image drawing unit 33 and a display unit 34 are coupled to the internal address bus 36a and the internal data bus 36b. The command fetch unit 32 fetches a command. The image drawing unit 33 draws various graphics such as a line or a curve. The display unit 34 controls a display device (not shown) like a CRT (cathode-ray tube) display coupled thereto through a graphic bus interface 35 so as to display graphics on the display device.

FIG. 10 is a circuit diagram of the command fetch unit 32 shown in FIG. 9. A command fetch start circuit 41 generates an instruction to fetch a command, which activates a microstart address programmable logic array (PLA) 43. The command fetch start circuit 41 is supplied with a chip select signal $\overline{\text{CS}}$, the read/write signal R/$\overline{\text{W}}$ and necessary information. A micro read only memory (μROM) 44 stores microprograms. A command register 42 temporarily stores a command supplied through the internal data bus 36b, and controls the PLA 43 so as to output an address related to the fetched command. When an address is supplied to the μROM 44, a corresponding microprogram is read out therefrom. A signal derived from the μROM 44 consists of a plurality of bits. Some of the output bits form various control signals. Two bits among the output bits are set and reset signals, which are supplied to an RS flip-flop 45. Similarly, two bits among the output bits are set and reset signals, which are supplied to an RS flip-flop 46.

When the address of a microprogram which requires to generate the command request signal CREQ is supplied to the μROM 44, the flip-flop 45 is set. Since the flip-flop 46 is being reset at this time, the command request signal CREQ is derived from the Q-terminal of the flip-flop 45 and passes through an AND gate 47 and the host bus interface circuit 31. When a command which indicates the end of inputting command is stored in the command register 42, the μROM 44 outputs the reset signal to the flip-flop 45. Thus, the command request signal CREQ is made inactive.

When the address of a microprogram which requires to generate the data request signal DREQ is supplied to the μROM 44, the flip-flop 46 is set. The data request signal DREQ is derived from the Q-terminal of the flip-flop 46 and passes through the host bus interface circuit 31. When an address for a microprogram which requests to terminate inputting related data is given to the μROM 44, outputs the reset signal to the flip-flop 46. Thus, the data request signal DREQ is made active. During the above operation, an address calculator 48 is controlled by the μROM 44 so as to generate an address related to a desired command.

Figure 11:
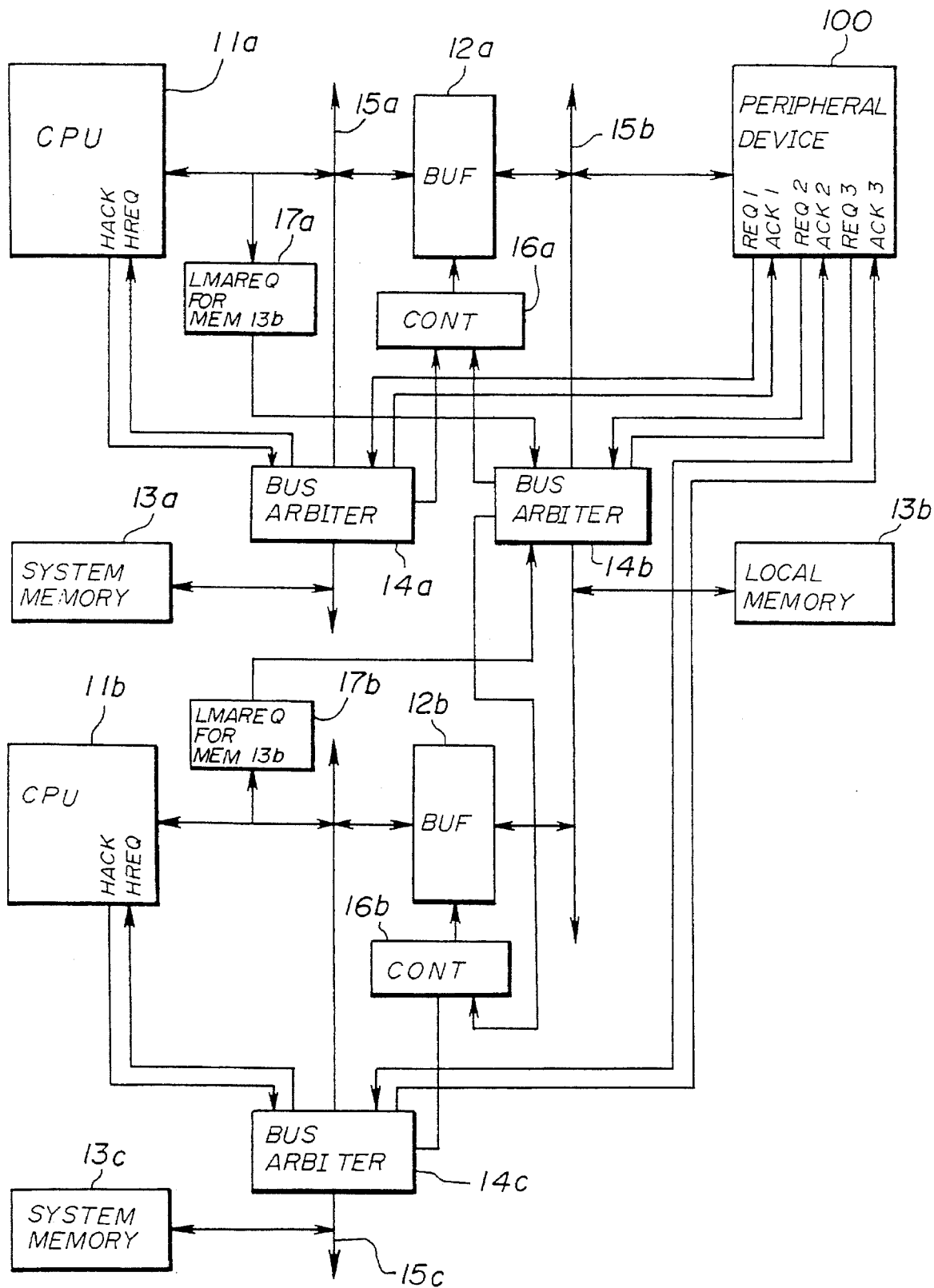
FIG. 11 is block diagrams of a fundamental structure of a system according to a second embodiment of the present invention where two CPUs are used.

A description is given of a second preferred embodiment of the present invention with reference to FIG. 11. In the second embodiment, two CPUs 11a and 11b are provided in a system, and a peripheral device 100 can generates three request signals REQ1, REQ2 and REQ3. The CPU 11a, a buffer 12a, a buffer controller 16a and an LMAREQ generator 17a are the same as corresponding blocks shown in FIG. 2. The CPU 11b is connected to a bus 15c, to which a system memory 13c is connected. A bus arbiter 14c controls a request for acquiring the right to use the bus 15c supplied from the peripheral device 100. The request signal REQ3 is supplied to the bus arbiter 14c. In response to the request signal REQ3, the bus arbiter 14c outputs the hold request signal HREQ to the CPU 11b. When the CPU 11b may transfer the right to use the bus 15c to the peripheral device 100, the CPU 11b makes the hold acknowledge signal HACK active. In response to this change in the hold acknowledge signal HACK, the bus arbiter 14c makes the request acknowledge signal ACK3 active. A buffer 12b is interposed between the buses 15b and 15c, and is controlled by a buffer controller 16b. The buffer controller 16b is controlled by control signals supplied from the bus arbiters 14b and 14c in the same manner as the buffer controller 16a. The hold acknowledge signals HACK derived from the CPUs 11a and 11b are supplied to the bus arbiter 14b through signal lines (not shown for convenience' sake). When the bus arbiter 14c gives the peripheral device 100 the right to use the bus 15c, the bus arbiter 14b gives the peripheral device 100 the right to use the bus 15b in response to the hold acknowledge signal HACK supplied from the CPU 11b.

The present invention is not limited to the aforementioned embodiments, and variations and modifications may be made without departing from the scope of the present invention.

What is claimed is:

1. A data control device which acquires a right to use a plurality of buses and performs data control, said data control device, a first bus arbiter, and a memory device being coupled to a first one of said plurality of buses, an external device and a second bus arbiter being coupled to a second one of said plurality of buses, said data control device being directly connected to said first and second bus arbiters and comprising:

microprogram storing means for storing microprograms;

command storing means for storing a command supplied from said memory device coupled to said first one of said plurality of buses;

address generating means, coupled to said command storing means and said microprogram storing means, for generating an address signal to be supplied to said microprogram storing means by using said command stored in said command storing means, said microprogram storing means generating control signals corresponding to one of said microprograms related to said address signal supplied from said address generating means;

data processing means for processing data to be supplied from or to said external device coupled to said second one of said plurality of buses;

request generating means, coupled to said microprogram storing means, for selectively generating a plurality of request signals for said data processing means to acquire the right to use said first and second ones of said plurality of buses by using said control signals supplied from said microprogram storing means, said plurality of request signals being based on an amount of data to be communicated, said communicated data including said data to be processed by said data processing means and said command to be stored in said command storing means, said plurality of request signals generated by said request generating means includes a first bus request signal generated when said command is to be communicated on said first one of said plurality of buses and a second bus request signal when said data is to be communicated on said second one of said plurality of buses, said first and second bus requests are transmitted from the request generating means directly and respectively to said first and second bus arbiters for granting said right to use said first and second ones of said plurality of buses.

2. A data control device as claimed in claim 1, wherein said plurality of request signals include a third bus request signal, and said request generating means generates said third bus request signal when said data processing means communicates said data with a second device included in said external device.

3. A data control device as claimed in claim 1, wherein said request generating means comprises flip-flop means for receiving said control signals supplied from said microprogram storing means and for generating output signals, and logic means for generating said plurality of request signals based on said output signals supplied from said flip-flop means.

4. A data control system comprising:

a first bus and a second bus;

a data processing unit means, coupled to said first bus, for processing first data to be communicated and for generating a local request signal;

peripheral device means, coupled to said second bus, for processing second data to be communicated and for selectively generating first and second request signals for acquiring a right to use said first and second buses based on types of said second data to be communicated, wherein said first request signal is generated when data on said first bus is to be communicated and said second request signal is generated when one of a plurality of commands on said second bus is to be communicated;

first bus arbiter means, directly connected to said first bus, said data processing unit means and said peripheral device means for determining whether the right to use said first bus is acquired by said peripheral device means based on said first request signal supplied from said peripheral device means;

second bus arbiter means, directly connected to said second bus, said data processing unit means and said peripheral device means, for determining whether the right to use said second bus is acquired by one of said peripheral device means and said data processing unit means based on said second request signal supplied from said peripheral device means and said local request signal supplied from said data processing unit means;

first and second memory means, coupled to said first and second buses respectively, for respectively storing said data and data including said plurality of commands to be output to said first and second buses; and buffer means, connected between said first and second buses, for preventing said first data from competing with said second data.

5. A data control system as claimed in claim 4, wherein when said peripheral device means requests to input a command which is data stored in said second memory means, said peripheral device means generates said second request signal to be supplied to said second bus arbiter means.

6. A data control system as claimed in claim 4, wherein when said peripheral device means requests to communicate data with said first memory means, said peripheral device means generates said first request signal to be supplied to said first bus arbiter means.

7. A data control system as claimed in claim 4, wherein said first memory means stores data to be communicated with said data processing unit means or said peripheral device means.

8. A data control system as claimed in claim 4, wherein said first bus arbiter means includes means for sending said peripheral device means an acknowledge signal when said first bus arbiter means gives said peripheral device means the right to use said first bus.

9. A data control system as claimed in claim 4, wherein said second bus arbiter means includes means for sending said peripheral device means an acknowledge signal when said second bus arbiter means gives said peripheral device means the right to use said second bus.

10. A data control system as claimed in claim 4, wherein said first bus arbiter means under normal operating conditions of said data control system gives said data processing unit means the right to use said first bus.

11. A data control system as claimed in claim 4, wherein said peripheral device means comprises:

microprogram storing means for storing microprograms;

command storing means for storing a command supplied through said second bus;

address generating means, coupled to said command storing means and said microprogram storing means, for generating an address signal to be supplied to said microprogram storing means by using said command stored in said command storing means, said microprogram storing means generating control signals corresponding to one of said microprograms related to said address signal supplied from said address generating means;

data processing means for processing data to be transferred through said second bus; and request generating means, coupled to said microprogram storing means, for selectively generating said first and second request signals by using said control signals supplied from said microprogram storing means, said plurality of request signals being based on types of said data to be transferred through said second bus, said transferred data including said data to be processed by said data processing means and said command to be stored in said command storing means.

12. A data control system as claimed in claim 4, wherein said second bus arbiter means includes a) an AND gate having a first terminal to which said local request signal is supplied through a first inverter, and a second terminal to which said second request signal is supplied to, and b) a flip-flop having a set terminal supplied with an output signal of said AND gate, a reset terminal supplied with said second request signal through a second inverter, and a Q-terminal which outputs an acknowledge signal which is to be generated when the right to use said second bus is given to said peripheral device means.

13. A data control system as claimed in claim 4, wherein said buffer means includes bidirectional buffers, and logic means for controlling said bidirectional buffers on the basis of information about whether each of said first and second bus arbiter means gives the right to use said first and second buses to one of said data processing unit means and said peripheral device means.

14. A data control system as claimed in claim 4, wherein said first bus arbiter means is provided in said data processing unit means, and said first request signal derived from said peripheral device means is directly supplied to said data processing unit means.

15. A data control system as claimed in claim 4, wherein said data processing unit means includes means for generating said local request signal based on an address signal.

16. A data control system as claimed in claim 4, wherein said data includes image data.

17. A data control system as claimed in claim 4, wherein said data processing unit means includes a central processing unit.

18. A data control system comprising:

a plurality of first buses;

a second bus;

a plurality of data processing unit means, each said data processing unit means being provided for each of said first buses and connected thereto, for processing data to be communicated and for generating a local request signal;

peripheral device means, coupled to said second bus, for processing data to be communicated and for selectively generating a plurality of request signals for acquiring a right to use said first and second buses based on types of said data to be communicated, wherein said plurality of request signals includes a first request signal generated when data on one of said first buses is to be communicated and a second request signal generated when one of a plurality of commands on said second bus is to be communicated;

a plurality of first bus arbiter means, each said first bus arbiter means being directly connected to one of said first buses, said peripheral device means and one of said data processing unit means, for determining whether the right to use a corresponding one of said plurality of first buses should be given to said peripheral device means based on said first request signal supplied from said peripheral device means;

second bus arbiter means, directly connected to said second bus, said data processing unit means and said peripheral device means, for determining whether the right to use said second bus is acquired by one of said peripheral device means and any said data processing unit means based on said second request signal supplied from said peripheral device means and said local request signals supplied from said data processing unit means;

a plurality of first memory means, each said first memory means coupled to one of said first buses, for storing said data to be output to a related one of said first buses;

second memory means, coupled to said second bus, for storing data including said, plurality of commands to be output to said second bus; and a plurality of buffer means, connected between said second bus and each of said first buses, for preventing data on said second bus from competing with data on a related one of said first buses.

19. A data control system as claimed in claim 18, wherein when said peripheral device means requests to input a command which is stored in said second memory means, said peripheral device means generates one of said request signals which is to be supplied to said second bus arbiter means.

20. A data control system as claimed in claim 18, wherein when said peripheral device means requests to exchange data with said first memory means coupled to one of said first buses, said peripheral device means generates corresponding one of said request signals which is to be supplied to a related one of said first bus arbiter means.

* * * * *